United States Patent
Tikalsky

(10) Patent No.: US 11,459,249 B2
(45) Date of Patent: *Oct. 4, 2022

(54) CENTRIFUGAL REVERSE OSMOSIS SYSTEM

(71) Applicant: Centrifugal Solutions LLC, Oakhurst, CA (US)

(72) Inventor: John M. Tikalsky, Oakhurst, CA (US)

(73) Assignee: Centrifugal Solutions LLC, Oakhurst, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/888,120

(22) Filed: May 29, 2020

(65) Prior Publication Data

US 2020/0290897 A1 Sep. 17, 2020

Related U.S. Application Data

(63) Continuation of application No. 16/510,538, filed on Jul. 12, 2019, now Pat. No. 10,689,270.

(Continued)

(51) Int. Cl.
*C02F 1/44* (2006.01)
*B01D 63/16* (2006.01)
(Continued)

(52) U.S. Cl.
CPC .............. *C02F 1/441* (2013.01); *B01D 63/16* (2013.01); *C02F 1/38* (2013.01); *B01D 61/08* (2013.01);
(Continued)

(58) Field of Classification Search
CPC ...... C02F 1/441; C02F 1/38; C02F 2301/026; C02F 1/004; C02F 2103/08;
(Continued)

(56) References Cited

U.S. PATENT DOCUMENTS 3,400,074 A 9/1968 Grenci
3,567,030 A 3/1971 Loeffler et al.
(Continued)

FOREIGN PATENT DOCUMENTS

CN 1 769 194 A 5/2006
GB 1 393 547 A 5/1975
(Continued)

OTHER PUBLICATIONS

Wild, Peter Martin, "Development, Optimization and Implementation of the Design for a Centrifugal Reverse-Osmosis Desalination System," Aug. 1994, 271 pages, University of British Columbia, Department of Mechanical Engineering.
(Continued)

*Primary Examiner* — Krishnan S Menon
(74) *Attorney, Agent, or Firm* — Venable LLP

(57) ABSTRACT

A reverse osmosis system includes a wheel formed of a hollow central hub, radial tubes fluidly connected to the central hub, semi-permeable membranes provided in each radial tube, a permeate outlet tube, and a concentrate outlet tube; a permeate collection tank; a concentrate collection tank; and a drive mechanism. The drive mechanism rotationally drives the wheel while the source liquid is supplied to the central hub of the wheel, the rotation causing the source liquid to enter the radial tubes in radially outward directions and cause pressure increase on the source liquid in the radial tubes. The pressure increase forces the source liquid through the semi-permeable membranes to separate into permeate and concentrate, the permeate being directed to the permeate collection tank through the permeate outlet tube and the concentrate being directed to the concentrate collection tank through the concentrate outlet tube.

20 Claims, 4 Drawing Sheets

Related U.S. Application Data

(60) Provisional application No. 62/697,048, filed on Jul. 12, 2018.

(51) Int. Cl.
*C02F 1/38* (2006.01)
*B01D 61/08* (2006.01)
*C02F 1/00* (2006.01)
*C02F 103/08* (2006.01)

(52) U.S. Cl.
CPC .......... *B01D 2315/02* (2013.01); *C02F 1/004* (2013.01); *C02F 2103/08* (2013.01); *C02F 2301/026* (2013.01)

(58) Field of Classification Search
CPC .......... C02F 2103/007; C02F 2201/008; C02F 2201/009; B01D 63/16; B01D 61/08; B01D 2315/02; B01D 2315/06; B01D 61/06; B01D 63/10; B01D 2313/246; B01D 2313/24; Y02A 20/212; Y02A 20/131
See application file for complete search history.

(56) References Cited

U.S. PATENT DOCUMENTS

| | | |
|---|---|---|
| 3,669,879 A | 6/1972 | Berriman |
| 4,230,564 A | 10/1980 | Keefer |
| 4,333,832 A | 6/1982 | Siwecki et al. |
| 4,341,629 A | 7/1982 | Uhlinger |
| 4,702,842 A | 10/1987 | Lapierre |
| 4,886,597 A | 12/1989 | Wild et al. |
| 4,973,408 A | 11/1990 | Keefer |
| 5,229,005 A | 7/1993 | Fok et al. |
| 5,254,250 A | 10/1993 | Rolchigo et al. |
| 6,132,613 A | 10/2000 | Hopkin et al. |
| 6,139,740 A | 10/2000 | Oklejas |
| 6,190,558 B1 | 2/2001 | Robbins |
| 7,081,205 B2 | 7/2006 | Gordon et al. |
| 7,160,469 B2 | 1/2007 | Mayer et al. |
| 7,416,666 B2 | 8/2008 | Gordon |
| 7,476,323 B2 | 1/2009 | Gordon |
| 7,510,658 B2 | 3/2009 | Gordon |
| 8,025,157 B2 | 9/2011 | Takita et al. |
| 8,147,692 B2 | 4/2012 | Oklejas, Jr. |
| 8,308,953 B2 | 11/2012 | Lee |
| 9,416,795 B2 | 8/2016 | Friedrichsen et al. |
| 9,573,098 B2 | 2/2017 | Lechuga Andrade et al. |
| 9,695,064 B2 | 7/2017 | Oklejas, Jr. |
| 2005/0218062 A1 | 10/2005 | Forman |
| 2011/0037273 A1 | 2/2011 | Jin |
| 2013/0133250 A1 | 5/2013 | Chan |

FOREIGN PATENT DOCUMENTS

| | | |
|---|---|---|
| JP | 57-209605 A | 12/1982 |
| WO | 98/36823 A1 | 8/1998 |

OTHER PUBLICATIONS

International Search Report and Written Opinion dated Oct. 9, 2019, in International Application No. PCT/US19/41661.
Extended European Search Report dated Mar. 16, 2022, in European Patent Application No. 19833538.2.

CENTRIFUGAL REVERSE OSMOSIS SYSTEM

This application claims the benefit of provisional U.S. Patent Application No. 62/697,048, filed Jul. 12, 2018, which is incorporated herein by reference.

BACKGROUND OF THE INVENTION

Field of the Invention

The present invention relates to a desalination system, and particularly to a system and method that can economically and efficiently desalinize seawater or otherwise convert non-potable water to potable water using centrifugal reverse osmosis.

Description of the Related Art

Industrial applications of desalination technology include reverse osmosis, multi-stage flash desalinization, and multiple-effect evaporation. In flash evaporation, at a certain temperature, the water pressure decreases and the water rapidly evaporates. In multi-stage flash desalination, seawater is heated and evaporated in a plurality of progressively lower pressure flash chambers, and the resulting steam is condensed to obtain fresh water. In multiple-effect evaporation, water is evaporated among a plurality of evaporators in series, with an upstream evaporator acting as a heat source of a subsequent evaporator, and the vapor is condensed into fresh water. Reverse osmosis can include elevating the pressure of a solvent-solute admixture to above its osmotic pressure and bringing it into contact with a membrane which is permeable to the solvent, but not to the solute. Some solvent passes through the membrane leaving a concentrated solvent-solute admixture behind. In reverse osmosis application to seawater desalinization, the seawater is pressurized and directed through a semi-permeable membrane to form a freshwater permeate and a saltwater concentrate.

However, each desalination technology has its disadvantages, including high energy consumption, susceptibility to fouling, and complicated construction, resulting in maintenance and safety issues.

Reverse osmosis has attracted considerable attention as a water desalinization technique because it does not involve any phase changes of the saline water. Most of the energy consumed by a reverse osmosis operation is consumed in bringing the solvent/solute admixture to a pressure above the osmotic pressure of the admixture. Achieving the requisite high pressure for reverse osmosis in an economical manner, particularly in desalinizing seawater, has been difficult and expensive with regard to energy costs. Previous reverse osmosis techniques had also experienced difficulty in providing equipment which would be capable of handling large volumes of solvent-solute admixture economically at the requisite high pressures.

Moreover, in reverse osmosis, the saltwater concentrate must be discarded in an environmentally safe manner. In a land-based reverse osmosis plant, the concentrate cannot simply be disposed near shore.

What is needed is a reverse osmosis desalinization system and method that has a simple structure, can be easily managed and maintained, and has low energy consumption and low operating costs.

SUMMARY OF THE INVENTION

According to one aspect of the present invention, a reverse osmosis system for separating a source liquid into permeate and concentrate includes a wheel formed of a hollow central hub, radial tubes fluidly connected to the central hub, semi-permeable membranes provided in each radial tube, a permeate outlet tube fluidly connected to the radial tubes and communicating with the semi-permeable membranes, and a concentrate outlet tube fluidly connected to the radial tubes and communicating with the semi-permeable membranes; a permeate collection tank fluidly connected to the permeate outlet tube; a concentrate collection tank fluidly connected to the concentrate outlet tube; and a drive mechanism connected to the central hub of the wheel to rotationally drive the wheel. The drive mechanism rotationally drives the wheel while the source liquid is supplied to the central hub of the wheel, the rotation causing the source liquid to enter the radial tubes in radially outward directions and cause pressure increase on the source liquid in the radial tubes. The pressure increase forces the source liquid through the semi-permeable membranes to separate into the permeate and the concentrate, the permeate being directed to the permeate collection tank through the permeate outlet tube and the concentrate being directed to the concentrate collection tank through the concentrate outlet tube.

According to another aspect of the present invention, a reverse osmosis system for separating a source liquid into permeate and concentrate includes a rotatable wheel formed of radial tubes fluidly connected to an inlet, semi-permeable membranes provided in each radial tube, a permeate outlet tube fluidly connected to the radial tubes and communicating with the semi-permeable membranes, and a concentrate outlet tube fluidly connected to the radial tubes and communicating with the semi-permeable membranes; a stationary permeate collection tank fluidly connected to the permeate outlet tube; a stationary concentrate collection tank fluidly connected to the concentrate outlet tube; and a drive mechanism configured to rotationally drive the wheel. The drive mechanism rotationally drives the wheel while the source liquid is supplied to the inlet of the wheel, the rotation causing the source liquid to enter the radial tubes in radially outward directions and cause pressure increase on the source liquid in the radial tubes. The pressure increase forces the source liquid through the semi-permeable membranes to separate into the permeate and the concentrate, the permeate being directed to the stationary permeate collection tank through the permeate outlet tube and the concentrate being directed to the stationary concentrate collection tank through the concentrate outlet tube.

According to yet another aspect of the present invention, a method of operating a reverse osmosis system for separating a source liquid into permeate and concentrate includes providing a reverse osmosis system including a wheel formed of a hollow central hub, radial tubes fluidly connected to the central hub, semi-permeable membranes provided in each radial tube, a permeate outlet tube fluidly connected to the radial tubes and communicating with the semi-permeable membranes, and a concentrate outlet tube fluidly connected to the radial tubes and communicating with the semi-permeable membranes; a permeate collection tank fluidly connected to the permeate outlet tube; and a concentrate collection tank fluidly connected to the concentrate outlet tube. The method further includes continuously supplying the source liquid to the central hub of the wheel, and rotationally driving the wheel. The rotation causes the source liquid to enter the radial tubes in a radially outward direction and cause pressure increase on the source liquid in the radial tubes, the pressure increase forcing the source liquid through the semi-permeable membranes to separate into the permeate and the concentrate. The permeate is directed to the permeate collection tank through the permeate outlet tube and the concentrate is directed to the concentrate collection tank through the concentrate outlet tube.

According to still another aspect of the present invention, a centrifugal pump for pumping a source liquid includes a wheel formed of a hollow central hub, radial tubes fluidly connected to the central hub, and an outlet tube fluidly connected to the radial tubes; a stationary collection tank fluidly connected to the outlet tube; and a drive mechanism connected to the central hub of the wheel to rotationally drive the wheel, including the radial tubes and the outlet tube. The drive mechanism rotationally drives the wheel while the source liquid is supplied to the central hub of the wheel, the rotation causing the source liquid to enter the radial tubes in radially outward directions and cause pressure increase on the source liquid in the radial tubes, the pressure increase forcing the source liquid through the outlet tube and into the stationary collection tank.

These and other aspects and advantages will become apparent when the description below is read in conjunction with the accompanying drawings.

DESCRIPTION OF THE PREFERRED EMBODIMENTS

A reverse osmosis system of the present invention utilizes centrifugal forces developed in a rotating wheel to force source water through reverse osmosis filters or membranes and separate the source water into concentrate and permeate. The reverse osmosis system is preferably mounted on a sea-going vessel that can draw the incoming sea water from its immediate surroundings and dispose of the concentrate at the same location or remotely. However, the system can be readily mounted or constructed on land or on a land or water vehicle or structure such as a platform near any supply of water to be filtered. For example, the system can be mounted on a barge in a river to filter contaminants from the river water to produce potable water or near any source such as a well of non-potable water to produce potable water. It should be noted that the reverse osmosis system of the present invention is particularly useful in desalinizing seawater because of the efficiency of the system and the high osmotic pressures necessary to remove the salt components from seawater, for example, 800-1000 psi. Nevertheless, the system is also suitable in removing other materials from water that require lower osmotic pressures, for example, on the order of 100-200 psi, as in the case of brackish water or water with excess dirt or minerals.

Figure 1:
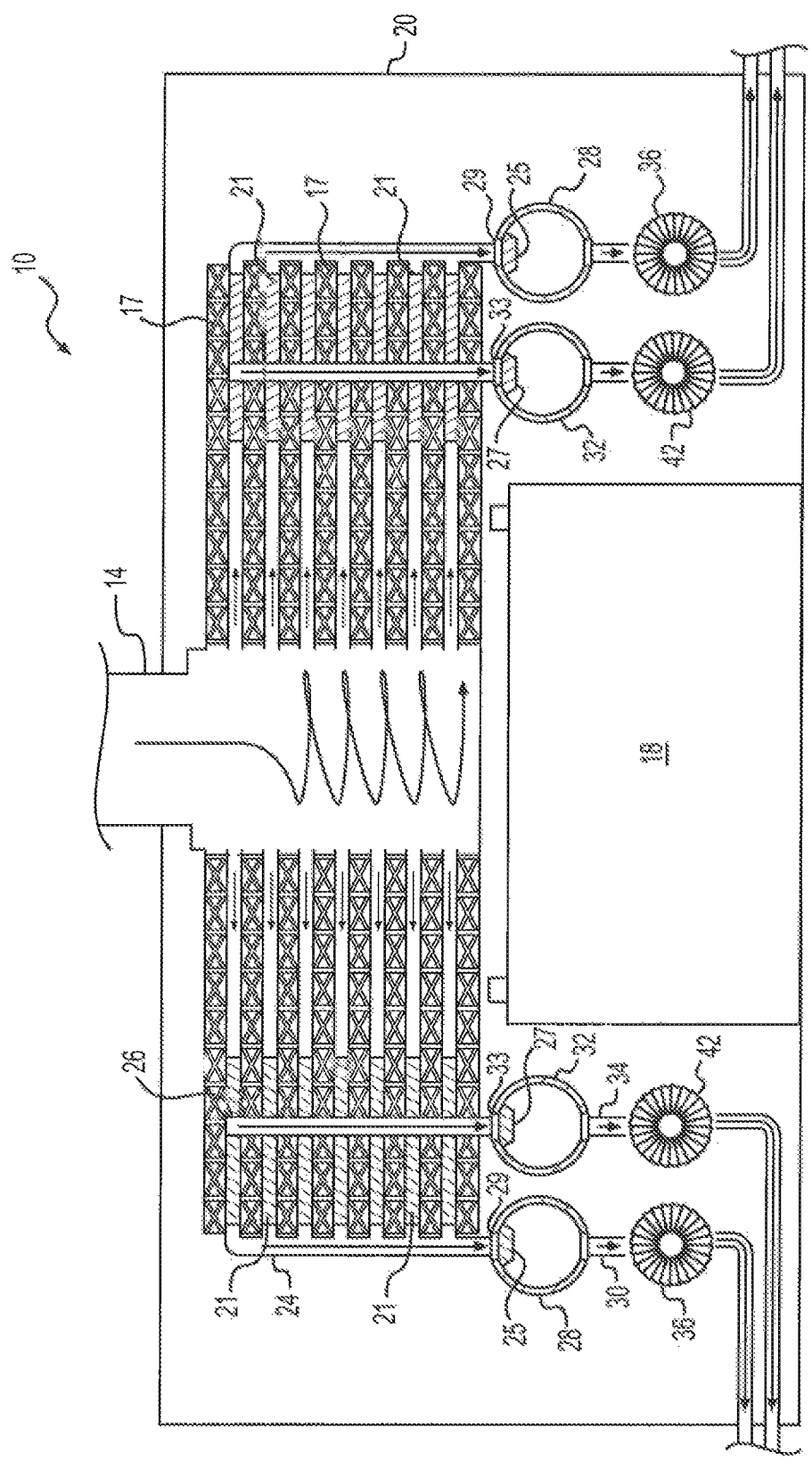
FIG. 1 is a schematic view of a reverse osmosis system according to a first embodiment of the present invention.
Figure 2:
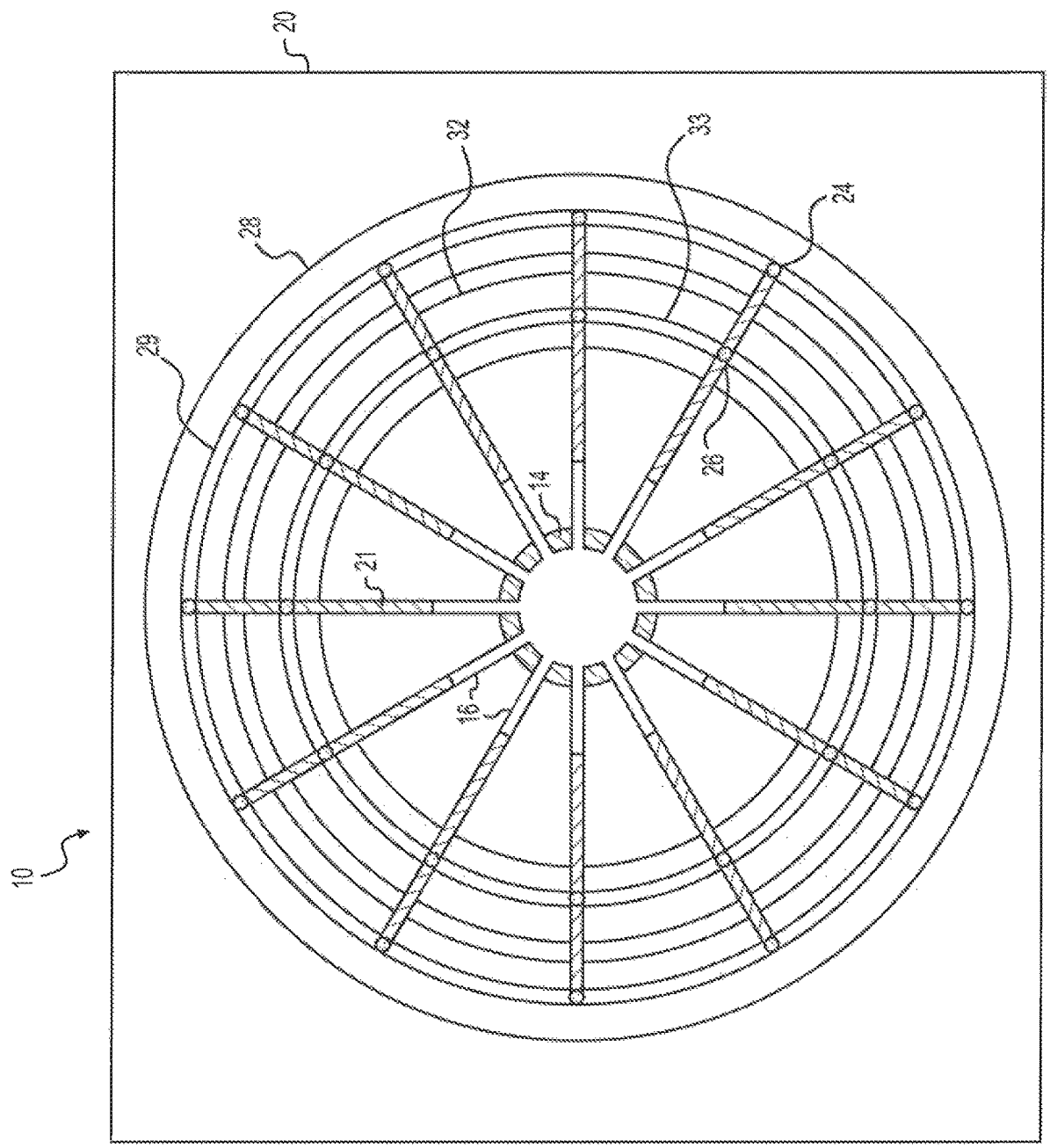
FIG. 2 is a plan view of the reverse osmosis system according to the first embodiment of the present invention.

As shown in FIGS. 1 and 2, in a first embodiment of the present invention, a centrifugal reverse osmosis system 10 includes a centrifuge wheel 12 that is formed of a central shaft or hub 14 and several radial spoke tubes 16. The central shaft 14 is formed as a hollow shaft, preferably of a structural material such as steel, and fluidly communicates with the spoke tubes 16, which are in the form of structural tubes. The spoke tubes 16 are fluidly connected to central shaft 14 in any suitable manner, such as by welding. In order to enable continuous filtration, the central shaft should have an internal diameter of sufficient size to provide a constant supply of source water to each of the spoke tubes, for example, 20 inches. The spoke tubes 16 are of a smaller size and can have a diameter in the range of 8 inches, as an example. Spoke tubes 16 are preferably formed at a number of levels that are separated in the vertical direction. In the depicted embodiment of FIG. 1, seven levels of tubes are shown, with each level having plural radial spoke tubes, ranging in number from 3 to 20, for example. As the spoke tubes 16 will be rotated at very high speeds, for example, 250 rpm, to induce high pressures in the source liquid, they will undergo intense forces. Accordingly, structural bracing 17 can be added to ensure structural integrity. The spoke tubes are depicted as being in a horizontal plane, but the invention is not limited thereto. For example, the spoke tubes can extend radially outward but inclined in a downward direction so as to take advantage of gravitational forces in increasing the pressure of the liquid therein.

Central shaft 14 is supported by unshown bearings to rotate about a vertical axis. In the embodiment of FIG. 1, in order to minimize the energy required for rotation, the wheel 12 can be magnetically levitated using active and/or passive magnetic bearings and be driven by a magnetic driver within maglev housing 18. For example, the shaft 14 can be supported by an active magnetic bearing and a passive magnetic bearing and be affixed to or made integral with a levitated rotor, which is driven by a motor stator within maglev housing 18. The rotor can be set between the active magnetic bearing and the motor stator. The active magnetic bearing can use plural electromagnets to control the tilt and the axial position of the shaft 14. In addition, in order to minimize friction and drag, the moving parts, namely, the wheel 12 and its components, can be housed within chamber 20, which can be maintained in a vacuum or near vacuum.

Each spoke tube 16 is provided with a reverse osmosis cartridge 21 of any known construction. Preferably, the cartridge 21 includes a multilayer membrane wound around a central collection core. As water is forced through the proximal end of the cartridge, the smaller water molecules pass through the membrane as permeate and travel in a spiral route to the collection core to exit through the distal end. The larger molecules, such as salt, are prevented from passing through the membrane and are collected as concentrate and exit through a side port of the cartridge 21. The outer diameter of the cartridge 21 should closely fit within the inner diameter of the spoke tubes 16 such that any liquid flowing radially through the spoke tubes will be forced through the reverse osmosis cartridge 21. Seals may be provided on the periphery of the cartridge 21 to ensure a fluid-tight fit.

As centrifuge wheel 12 rotates, liquid such as water in each of spoke tubes 16 is acted on by centrifugal force, causing the pressure of the source water to increase in each of the spoke tubes 16 to force the source water through semi-permeable membranes within membrane cartridges 21 and separate the source water into permeate and concentrate. It should be noted that the pressure on the water in each spoke tube will increase from the proximal end of the tube near the shaft 14 to its distal end due to increasing centrifugal force. Therefore, the cartridges 21 should be placed at a location in the spoke tubes where the pressure will reach a desired level for reverse osmosis. Such location can be determined by calculation or testing and will depend on specifications of the system such as spoke tube length and diameter, wheel rotation speed, type of source liquid, make up of membrane, etc. More than one cartridge 21 can be placed in series in each spoke tube 16. The location of the most proximal cartridge should be determined by the foregoing testing or calculation. Each membrane cartridge 21 includes a permeate outlet on its distal end and a concentrate outlet on its side wall. The distal end of each spoke tube 16 is fluidly connected to a permeate collection tube 24 such that each corresponding permeate outlet is fluidly connected to the permeate collection tube 24. Likewise, at a location corresponding to the concentrate outlet, each spoke tube 16 is fluidly connected to a concentrate collection tube 26 such that each concentrate outlet is fluidly connected to a concentrate collection tube 26. Preferably, permeate collection tube 24 and concentrate collection tube 26 are made of steel and the spoke tubes 16 are welded thereto.

Preferably, one permeate collection tube 24 and one concentrate collection tube 26 are provided for each spoke tube 16 in one level. For example, if ten spoke tubes 16 are provided in a single level or layer, then ten permeate collection tubes 24 and ten concentrate collection tubes 26 are also provided. Permeate collection tubes 24 and concentrate collection tubes 26 are arranged to vertically connect vertically aligned spoke tubes 16 in the different levels. The permeate collection tubes 24 are connected to a permeate tank 28 and the concentrate collection tubes 26 are connected to a concentrate tank 32 by dynamic seals. Permeate tank 28 and concentrate tank 32 are formed as annular shapes and are stationary. Permeate tank 28 can be of a greater internal diameter than that of concentrate tank 32 because a greater volume of permeate is expected to be produced relative to the concentrate. Permeate tank 28 and concentrate tank 32 include circular inlet slots 29, 33, respectively, to receive the discharge from permeate collection tubes 24 and concentrate collection tubes 26. That is, while permeate tank 28 and concentrate tank 32 are stationary, the permeate collection tubes 24 and the concentrate collection tubes 26 rotate relative thereto along with the spoke tubes 16.

In order to create the dynamic seal between circular permeate inlet slot 29 and permeate collection tubes 24 and between circular concentrate inlet slot 33 and concentrate collection tubes 26, the distal end of the collection tubes are respectively connected to a circular flange 25, 27, that has an arcuate cross-section. The circular flanges 25, 27 rotate integrally with collection tubes 24, 26. Circular flange 25 is arranged within permeate tank 28 with its arcuate cross-section matching the interior curve of the tank. That is, circular flange 25 closes circular permeate inlet slot 29 of permeate tank 28, and the interface between the upper surface of circular flange 25 and the interior surface of permeate tank 28 near slot 29 can be sealed by any suitable dynamic seal that is usable in high-speed, high-pressure applications. Elastomeric seals or reduced friction labyrinth seals may be suitable. Likewise, circular flange 27 is arranged within concentrate tank 32 and the interface between the upper surface of circular flange 27 and the interior surface of concentrate tank 32 near slot 33 can be sealed by a similar dynamic seal.

The permeate tank 28 discharges the permeate through one or more permeate discharge tubes 30. The discharged permeate can be potable water for supply to a potable water storage tank (106 in FIG. 4) either on the vessel or onshore. The pressure in the permeate discharge tube 30 should be sufficient to discharge the water to the potable water storage tank without the need for any auxiliary pumps. The concentrate generated by the membrane cartridges 21 is captured in the concentrate tank 32 and discharged through a concentrate discharge tube 34.

As the centrifuge wheel 12 rotates, water in central shaft 14 is supplied to the tube spokes 16 and pressure is generated in the spoke tubes 16 by centrifugal force. The pressure increases in the outer radial direction as the water flows through the membrane cartridge 21. Depending on the filtering application and dimensions of the system, the rotating speed of centrifuge wheel 12 is controlled to induce the desired water pressure. In seawater desalinization, for example, the wheel 12 is driven at 250 rpm and the pressure increases to a range from 800 to 1000 psi before the water is separated into the concentrate and permeate flows. Downstream of the membrane cartridge, the permeate in permeate tank 28 and the concentrate in concentrate tank 32 can reach pressures of 500 psi. In order to optimize the efficiency of the reverse osmosis system, the pressure in the permeate tank 28 and the concentrate tank 32 can be recaptured. For example, a turbine 36 can be provided in permeate discharge tube 30 and a turbine 42 can be provided in the concentrate discharge tube 34 to drive one or more generators. The generated electricity from the generators can be stored in batteries and used to power the maglev system or be used for other purposes.

Figure 3:
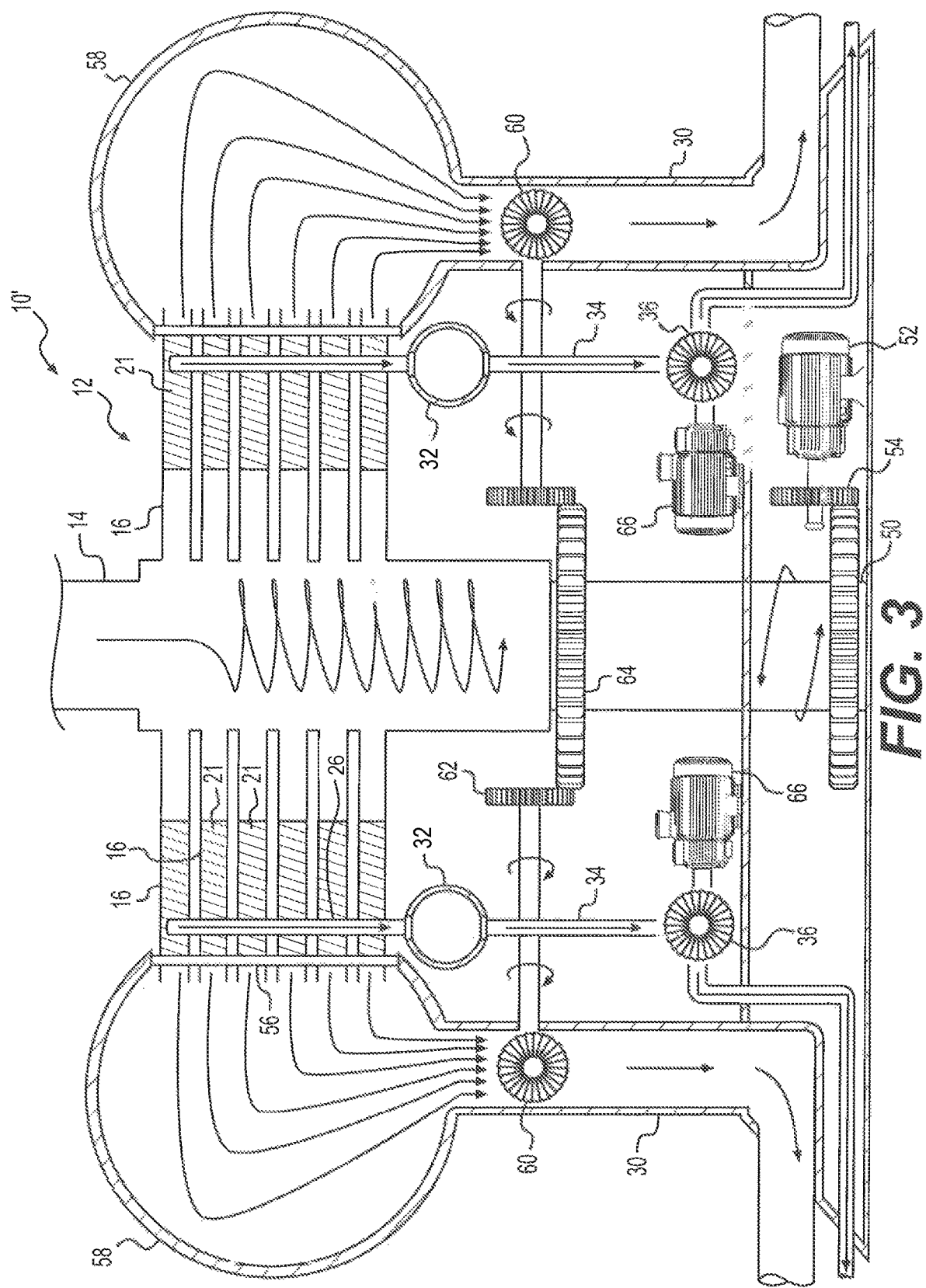
FIG. 3 is a schematic view of a reverse osmosis system according to a second embodiment of the present invention.

A second embodiment of a centrifugal reverse osmosis system 10' of the present invention is shown in FIG. 3. Common elements in the first and second embodiments are identified by the same reference numerals. Rather than use a maglev system as in the first embodiment, central shaft 14 of wheel 12 is driven by a connected main drive gear 50, which is driven by a drive motor 52 via a transmission gear 54. As drive gear 50 rotates, central shaft 14 rotates along with spoke tubes 16. Also, rather than use permeate collection tubes 24, the radial outer end of each spoke tube 16 is connected to a band 56. Preferably the band is made of steel and the spoke tubes 16 are welded thereto. Band 56 includes pass-through holes for each of the spoke tubes 16. Band 56 is circular and is joined to an annular permeate tank 58 by bearings and dynamic seals so as to form a radially inner wall of annular permeate tank 58. Dynamic seals similar to those in the first embodiment can be used. The permeate exiting from the membrane cartridges 21 is directed through band 56 into the permeate tank 58. While permeate tank 58 is stationary, the centrifuge wheel 12 and its radial spoke tubes 16, as well as band 56, rotate relatively thereto. The permeate generated by the membrane cartridges is captured in the permeate tank and discharged through permeate discharge tube 30. In order to optimize the efficiency of the reverse osmosis system of this embodiment, the pressure in the permeate tank 58 can be recaptured to directly assist in driving the wheel 12. For example, a turbine 60 can be provided in permeate discharge tube 30 to turn an auxiliary drive gear 62. Auxiliary drive gear 62 can drive an auxiliary driven gear 64 connected to central shaft 14 to aid in the rotation of central shaft 14. In addition, as in the first embodiment, turbine 36 can be provided in the concentrate discharge tube 34 to drive a generator 66. The generated electricity from generator 66 can be used to drive motor 52 or used for other purposes.

It should be noted that the foregoing embodiments are not to be limited to the details as described. For example, the second embodiment can utilize a maglev drive system and the first embodiment can employ the structure of permeate tank 58 rather than that of permeate tank 25. In addition two or more reverse osmosis systems 10, 10' can be used in parallel or in series in stages.

Figure 4:
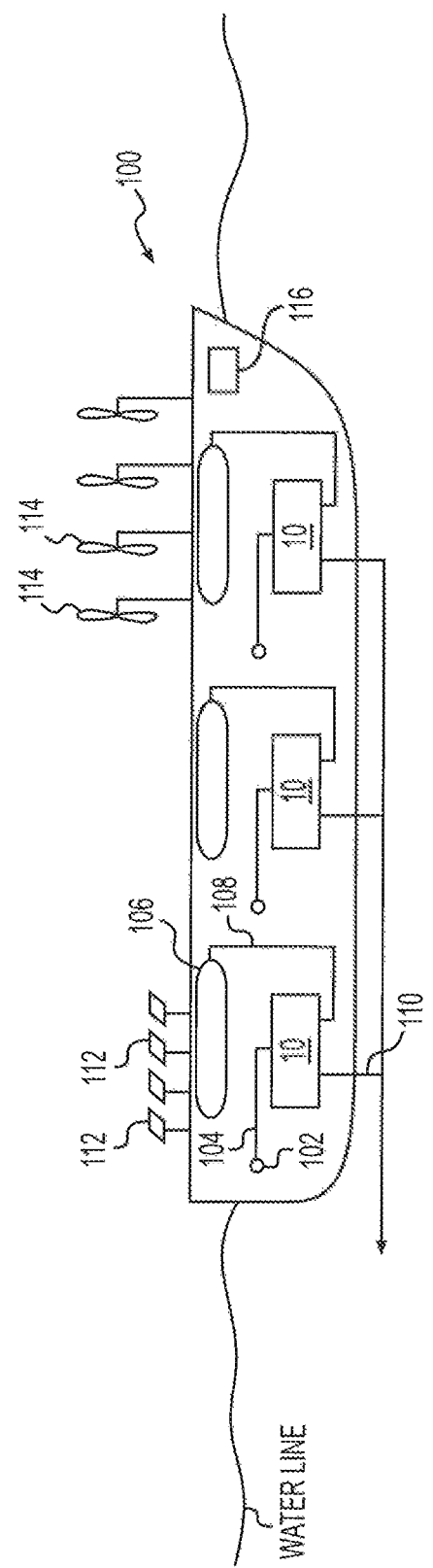
FIG. 4 is schematic view showing the reverse osmosis system of the present invention mounted in a vessel.

In many parts of the world in need of potable water, construction of desalinization plants may prove difficult due to remote locations, insufficient or unsuitable space, unavailability of skilled workers, etc. Therefore, installation of one or more reverse osmosis systems on a seagoing vessel is preferable. The system and vessel can be constructed at any suitable site and moved either nearshore or offshore of the target location for short term or long term use. Preferably, one or more reverse osmosis systems 10, 10' can be installed, in series or in parallel, below the water line of the vessel so that the seawater can be supplied by gravity to the central tube 14 without the need for supply pumps. For example, as shown in FIG. 4, the vessel 100 can be fitted with inlet ports 102 disposed at a desired distance below the waterline so as to supply the seawater through inlet lines 104 connected to the central shafts 14 of the reverse osmosis systems 10. Prefilters can be provided in the inlet lines 104 to increase desalinization efficiency, and any known upstream or downstream filters or equipment, such as charcoal and UV light sources, which remove or kill unwanted contaminants or microorganisms, can also be used as needed. The potable water permeate can be discharged through permeate discharge tubes and directed to onboard storage tanks 106 through tank supply lines 108. Alternatively, the tank supply lines 108 can be directly connected onshore. The concentrate discharge lines 34 can be connected to vessel discharge lines 110 and the concentrate can be discharged through vessel discharge lines 110 either near the vessel or, if the discharge lines are of sufficient length, remote from the vessel. Remote discharge will prevent overly-concentrated source water from reentering the reverse osmosis systems onboard. Environmental regulations may prevent the concentrate from being discharged near shore. By providing the reverse osmosis system on a sea-going vessel, the concentrate can be discharged away from shore and be safely dissipated.

In order to decrease energy costs, the preferred primary source of energy for driving the wheel 12, either by maglev driving or motor driving, is an array of solar panels 112 provided on the deck of the vessel 100. Alternatively or supplementally, wind turbines 114 can be erected on the deck of the vessel. Energy generated by the solar panels and/or wind turbines can be stored in batteries 116 onboard. Further, the vessel is preferably electrically driven. A primary engine of any known type, such as a diesel engine, can be used to drive a generator to generate the electricity used to drive electric motors that rotate propeller shafts. The electricity stored in batteries 116 can be used to supplement the electricity used for propulsion.

The system of the present invention can be used for purposes other than reverse osmosis, such as a primary pump. For example, if the membrane cartridges 21 are removed from spoke tubes 16 and concentrate collection tubes 26 are shut off or altogether eliminated, then the system will act as a pump, with the source liquid being input to shaft 12, pressurized in spinning spoke tubes 16, and forced into tank 28 or 58.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A reverse osmosis system for separating a source liquid into permeate and concentrate, the system comprising:
   a wheel formed of a hollow central hub, radial tubes fluidly connected to the central hub, semi-permeable membranes provided in each radial tube, a permeate outlet tube fluidly connected to the radial tubes and communicating with the semi-permeable membranes, and a concentrate outlet tube fluidly connected to the radial tubes and communicating with the semi-permeable membranes;
   a permeate collection tank fluidly connected to the permeate outlet tube;
   a concentrate collection tank fluidly connected to the concentrate outlet tube;
   a supply source for supplying the source liquid to the central hub of the wheel; and
   a drive mechanism connected to the central hub of the wheel to rotationally drive the wheel,
   wherein the drive mechanism rotationally drives the wheel while the source liquid is supplied from the supply source to the central hub of the wheel, the rotation causing the source liquid to flow from the central hub directly into the radial tubes in radially outward directions and generating pressure increase on the source liquid within the radial tubes, the pressure increase generated within the radial tubes being sufficient to force the source liquid through the semi-permeable membranes to separate into the permeate and the concentrate, the permeate flowing radially outward through the semi-permeable membranes and being directed to the permeate collection tank through the permeate outlet tube and the concentrate being directed to the concentrate collection tank through the concentrate outlet tube.

2. The reverse osmosis system according to claim 1, wherein the drive mechanism comprises a magnetic levitation and propulsion device that causes the rotational driving of the wheel without contact with the wheel.

3. The reverse osmosis system according to claim 1, wherein the drive mechanism comprises a motor and gear system connected to the wheel to cause the rotational driving of the wheel.

4. The reverse osmosis system according to claim 1, wherein the radial tubes are disposed in one or more layers separated vertically and the permeate outlet tube and the concentrate outlet tube are arranged transversely to the radial tubes and rotate with the radial tubes.

5. The reverse osmosis system according to claim 4, wherein the permeate outlet tube and the concentrate outlet tube are arranged parallel to the central hub, with the permeate outlet tube being disposed radially inward of the concentrate outlet tube.

6. The reverse osmosis system according to claim 4, wherein the permeate collection tank and the concentrate collection tank are configured as stationary annular tanks respectively connected to the permeate outlet tube and the concentrate outlet tube with dynamic seals.

7. The reverse osmosis system according to claim 1, further comprising one or more turbines driven by fluid exiting at least one of the permeate collection tank and the concentrate collection tank.

8. The reverse osmosis system according to claim 1, further comprising plural permeate outlet tubes and concentrate outlet tubes, the permeate outlet tubes being spaced apart from one another and the concentrate outlet tubes being spaced apart from one another, each of the permeate outlet tubes being fluidly connected to the permeate collection tank and each of the concentrate outlet tubes being fluidly connected to the concentrate collection tank.

9. The reverse osmosis system according to claim 1, wherein the source liquid is seawater and the system is housed in a seagoing vessel, an inlet of the central hub of the wheel being arranged below the waterline of the seagoing vessel.

10. A reverse osmosis system for separating a source liquid into permeate and concentrate, the system comprising:
- a rotatable wheel formed of radial tubes fluidly connected to an inlet, semi-permeable membranes provided in each radial tube, a permeate outlet tube fluidly connected to the radial tubes and communicating with the semi-permeable membranes, and a concentrate outlet tube fluidly connected to the radial tubes and communicating with the semi-permeable membranes;
- a stationary permeate collection tank fluidly connected to the permeate outlet tube;
- a stationary concentrate collection tank fluidly connected to the concentrate outlet tube;
- a supply source for supplying the source liquid to the inlet of the wheel; and
- a drive mechanism configured to rotationally drive the wheel,
- wherein the drive mechanism rotationally drives the wheel while the source liquid is supplied from the supply source to the inlet of the wheel, the rotation causing the source liquid from the inlet to enter the radial tubes in radially outward directions and cause pressure increase on the source liquid in the radial tubes, the pressure increase generated within the radial tubes being sufficient to force the source liquid through the semi-permeable membranes to separate into the permeate and the concentrate, the permeate flowing radially outward through the semi-permeable membranes and being directed to the stationary permeate collection tank through the permeate outlet tube and the concentrate being directed to the stationary concentrate collection tank through the concentrate outlet tube.

11. The reverse osmosis system according to claim 10, wherein the drive mechanism comprises a magnetic levitation and propulsion device that causes the rotational driving of the wheel without contact with the wheel.

12. The reverse osmosis system according to claim 10, wherein the drive mechanism comprises a motor and gear system connected to the wheel to cause the rotational driving of the wheel.

13. The reverse osmosis system according to claim 10, wherein the radial tubes are disposed in one or more layers separated in a vertical direction and the permeate outlet tube and the concentrate outlet tube are arranged transversely to the radial tubes and rotate with the radial tubes.

14. The reverse osmosis system according to claim 13, wherein the permeate outlet tube and the concentrate outlet tube are arranged parallel to a central axis of the wheel, with the permeate outlet tube being disposed radially inward of the concentrate outlet tube.

15. The reverse osmosis system according to claim 13, wherein the stationary permeate collection tank and the stationary concentrate collection tank are configured as annular tanks respectively connected to the permeate outlet tube and the concentrate outlet tube with dynamic seals.

16. The reverse osmosis system according to claim 10, further comprising one or more turbines driven by fluid exiting at least one of the stationary permeate collection tank and the stationary concentrate collection tank.

17. The reverse osmosis system according to claim 10, further comprising plural permeate outlet tubes and concentrate outlet tubes, the permeate outlet tubes being spaced apart from one another and the concentrate outlet tubes being spaced apart from one another, each of the permeate outlet tubes being fluidly connected to the stationary permeate collection tank and each of the concentrate outlet tubes being fluidly connected to the stationary concentrate collection tank.

18. The reverse osmosis system according to claim 10, wherein the source liquid is seawater and the system is housed in a seagoing vessel, the inlet of the wheel being arranged below the waterline of the seagoing vessel.

19. A method of operating a reverse osmosis system for separating a source liquid into permeate and concentrate, the method comprising:
- providing a reverse osmosis system including a wheel formed of a hollow central hub, radial tubes fluidly connected to the central hub, semi-permeable membranes provided in each radial tube, a permeate outlet tube fluidly connected to the radial tubes and communicating with the semi-permeable membranes, and a concentrate outlet tube fluidly connected to the radial tubes and communicating with the semi-permeable membranes; a permeate collection tank fluidly connected to the permeate outlet tube; a concentrate collection tank fluidly connected to the concentrate outlet tube; and a supply source for supplying the source liquid to the central hub of the wheel;
- continuously supplying the source liquid to the central hub of the wheel; and
- rotationally driving the wheel while the source liquid is supplied from the supply source to the central hub of the wheel, the rotation causing the source liquid to flow from the central hub directly into the radial tubes in radially outward directions and generate pressure increase on the source liquid in the radial tubes, the pressure increase generated within the radial tubes being sufficient to force the source liquid through the semi-permeable membranes to separate into the permeate and the concentrate, the permeate flowing radially outward through the semi-permeable membranes and being directed to the permeate collection tank through the permeate outlet tube and the concentrate being directed to the concentrate collection tank through the concentrate outlet tube.

20. The reverse osmosis system according to claim 1, wherein the wheel is housed in a chamber having a vacuum.

* * * * *